(12) United States Patent
Kim et al.

(10) Patent No.: US 7,705,940 B2
(45) Date of Patent: Apr. 27, 2010

(54) DUAL DISPLAY LIQUID CRYSTAL DISPLAY DEVICE

(75) Inventors: Do Yeon Kim, Busan-si (KR); Hoon Kang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 276 days.

(21) Appl. No.: 12/007,800

(22) Filed: Jan. 15, 2008

(65) Prior Publication Data

US 2008/0129938 A1    Jun. 5, 2008

Related U.S. Application Data

(62) Division of application No. 10/736,591, filed on Dec. 17, 2003, now Pat. No. 7,342,624.

(30) Foreign Application Priority Data

Mar. 27, 2003 (KR) ............... 10-2003-0019104

(51) Int. Cl.
G02F 1/1335 (2006.01)
(52) U.S. Cl. .................................. 349/114
(58) Field of Classification Search ............. None
See application file for complete search history.

(56) References Cited

U.S. PATENT DOCUMENTS

| | | | |
|---|---|---|---|
| 6,285,422 B1 | 9/2001 | Maeda et al. | |
| 6,542,208 B1 * | 4/2003 | Akiyama | 349/96 |
| 6,768,529 B2 | 7/2004 | Umemoto et al. | |
| 6,839,101 B2 * | 1/2005 | Shima | 349/58 |
| 7,002,649 B2 | 2/2006 | Yuuki et al. | |
| 7,102,715 B2 * | 9/2006 | Kim et al. | 349/114 |
| 7,342,624 B2 * | 3/2008 | Kim et al. | 349/114 |
| 7,385,658 B2 * | 6/2008 | Kang et al. | 349/114 |
| 2004/0070711 A1 | 4/2004 | Wen et al. | |
| 2004/0109112 A1 * | 6/2004 | Yamauchi et al. | 349/113 |
| 2004/0189902 A1 | 9/2004 | Kim et al. | |
| 2004/0189904 A1 | 9/2004 | Kang et al. | |

FOREIGN PATENT DOCUMENTS

| | | |
|---|---|---|
| JP | 11-007259 | 1/1999 |
| JP | 2000-193956 | 7/2000 |
| JP | 2001-013502 | 1/2001 |
| WO | WO 00/36578 | 6/2000 |

* cited by examiner

*Primary Examiner*—Timothy Rude
(74) *Attorney, Agent, or Firm*—McKenna Long & Aldridge

(57) ABSTRACT

Disclosed is a dual display LCD device including: a front light unit supplying light; a first polarizer on the front light unit; an LCD panel on the first polarizer; a selective reflection/transmission part on the LCD panel; and a second polarizer on the selective reflection/transmission part; wherein the selective reflection/transmission part selectively reflects the light in a reflection mode to display an image on a front side thereof in a first display mode; and wherein the selective reflection/transmission part passes the light in a transmission mode to display an image on a rear side thereof in a second display mode.

4 Claims, 6 Drawing Sheets

State that voltage is applied

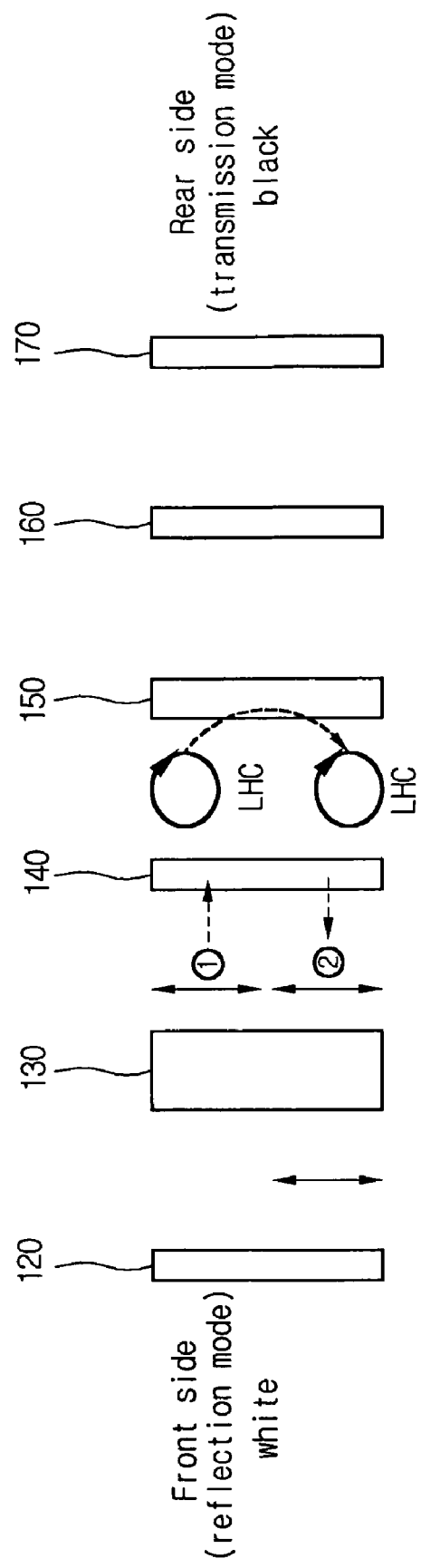

DUAL DISPLAY LIQUID CRYSTAL DISPLAY DEVICE

This is a divisional application of application Ser. No. 10/736,591 filed Dec. 17, 2003 now U.S. Pat. No. 7,342,624, which claims the benefit of Korean Patent Application No. 10-2003-0019104 filed on Mar. 27, 2003, which are hereby incorporated by reference for all purposes as if fully set forth herein.

BACKGROUND OF THE INVENTION

1. Field of the Invention

The present invention relates to a dual display liquid crystal display (LCD) device, and more particularly, to a dual display LCD device in which an image can be displayed on both the front side and the rear side of a single liquid crystal display panel.

2. Description of the Related Art

In general, cathode ray tubes (CRT) have been the most popular display device, but it is inconvenient to use in many situations because of its large size and heavy weight in relation to the display area.

Accordingly, a thin flat panel display has been developed that can be installed and used anywhere because it is slim in relation to its display area. Thin flat panel displays are replacing the CRT. For example, a thin film transistor liquid crystal display (TFT-LCD) device has an improved resolution over other flat panel display devices and a response speed as fast as the CRT in displaying moving pictures.

As known to those skilled in the art, LCD devices operation is based on the optical anisotropy and polarization property of liquid crystal molecules. Because liquid crystal molecules have a thin and long structure, it is possible to control the alignment direction of the liquid crystal molecules by artificially applying an electric field. Hence, if the alignment direction of the liquid crystal molecules is arbitrarily controllable, light may be transmitted or screened according to the alignment direction of the liquid crystal molecules due to the optical anisotropy of the liquid crystal so that a color image can be displayed.

Active matrix LCD devices have active switching elements with a nonlinear characteristic in pixels arranged in a matrix. The active matrix LCD device can display images by controlling the operation of each pixel by using the switching elements.

Recently a dual display LCD device capable of displaying an image in both the front and the rear of the LCD panel is being developed.

SUMMARY OF THE INVENTION

Accordingly, the present invention is directed to a dual display liquid crystal display (LCD device) and a operating method thereof that substantially obviate one or more problems due to limitations and disadvantages of the related art.

It is an object of the present invention to provide a dual display liquid crystal display capable of displaying an image on both the front side and the rear side of a single liquid crystal display panel, and an operating method thereof.

It is another object of the present invention to provide a mobile communication terminal capable of dually displaying on both the front side and the rear side of a dual display LCD device employing a single liquid crystal display panel.

It is a further object of the present invention to provide a selective reflection and transmission optical device capable of selectively reflecting or transmitting an incident light depending upon a linear polarization state of the incident light.

To achieve these objects and other advantages and in accordance with the purpose of the invention, as embodied and broadly described herein, a dual display liquid crystal display (LCD) device includes: a front light unit supplying light; a first polarizer on the front light unit; an LCD panel on the first polarizer; a selective reflection/transmission part on the LCD panel; and a second polarizer on the selective reflection/transmission part; wherein the selective reflection/transmission part selectively reflects the light in a reflection mode to display an image on a front side thereof in a first display mode; and wherein the selective reflection/transmission part passes the light in a transmission mode to display an image on a rear side thereof in a second display mode.

In an aspect of the present invention, there is provided a method for operating a dual display liquid crystal display (LCD) device. The method includes the steps of: converting light from a front light unit, into a linearly polarized light; passing the linearly polarized light through an LCD panel, and controlling a linear polarization state of the light passing through the LCD panel depending on whether a voltage is applied to the LCD panel; and selectively reflecting/transmitting the light with a selective reflection/transmission part depending on the circular polarization state of the light that has passed through the LCD panel; wherein the selective reflection/transmission part selectively reflects the light in a reflection mode to display an image on a front side thereof in a first display mode; and wherein the selective reflection/transmission part passes the light in a transmission mode to display an image on a rear side thereof in a second display mode.

In another aspect of the present invention, there is provided a mobile communication device comprising: a dual display liquid crystal display (LCD) device including: a front light unit supplying light; a first polarizer on the front light unit; an LCD panel on the first polarizer; a selective reflection/transmission part on the LCD panel; and a second polarizer on the selective reflection/transmission part; wherein the selective reflection/transmission part selectively reflects the light in a reflection mode to display an image on a front side thereof in a first display mode; and wherein the selective reflection/transmission part passes the light in a transmission mode to display an image on a rear side thereof in a second display mode; communication means for communicating with an external side; and a controller that controls the dual display LCD device and the communication means and controls on which side an image will be displayed.

In a further aspect of the present invention, there is provided a selective reflection/transmission optical device comprising: a cholesteric liquid crystal (CLC) film that selectively transmits light having a first circular polarization and reflects light having a second circular polarization, wherein the first and second circular polarizations have opposite directions; a first phase compensation film at the front of the CLC film that generates a phase difference of about $\lambda/4$ with respect to the light; and a second phase compensation film at the rear of the CLC film, for generating a phase difference of $\lambda/4$ with respect to the light; wherein depending on a linear polarization state of the light that is incident into the first phase compensation film, the selective reflection/transmission optical device passes the linearly polarized light that has a polarization axis in a first direction, and reflects all the linearly polarized light that has a polarization axis with an angle of 90° from the first direction.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of the present invention. In the drawings:

FIG. 6 is a view illustrating a polarization state of a light propagated from each structural element of a dual display LCD device in case a voltage is applied to an LCD panel according to the present invention.

DETAILED DESCRIPTION OF THE PREFERRED EMBODIMENTS

Reference will now be made in detail to a preferred embodiment of the present invention, examples of which are illustrated in the accompanying drawings.

Figure 1:
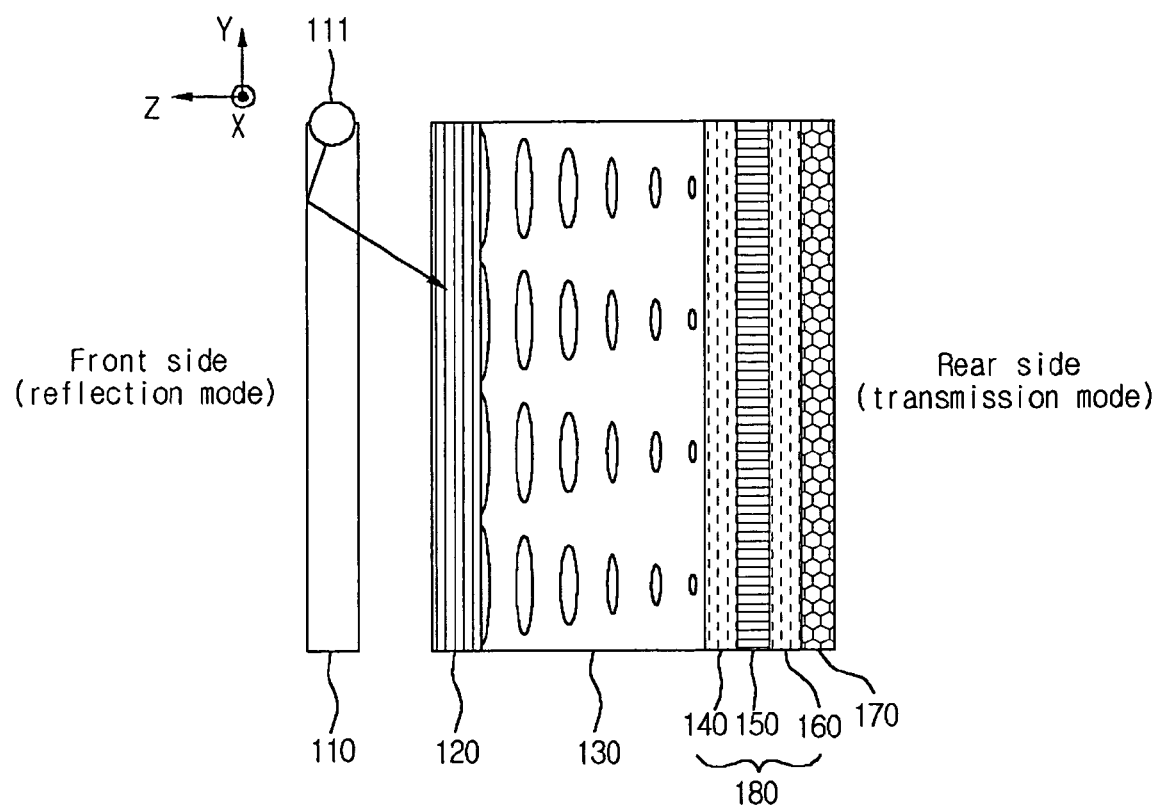
FIG. 1 is a schematic view illustrating the structure of a dual display liquid crystal display (LCD device) according to the present invention.

FIG. 1 is a schematic view illustrating a dual display liquid crystal display (LCD) device according to the present invention. Referring to FIG. 1, the dual display LCD device with a single LCD panel 130 is configured to display an image both on the front side and the rear side of the dual display LCD device. Additionally, the dual display LCD device includes a front light unit 110 at the front thereof, and the front light unit 110 includes a light source 111 at a side thereof. The front light unit 110 includes a front surface made of a transparent material and having a transmissivity that passes half of the incident light. Accordingly, the light irradiated from the light source 111 may be reflected from the front surface of the front light unit 110 and propagated toward the rear of the dual display LCD device. External light may also be incident into the LCD panel 130.

The dual display LCD device according to the present invention includes a first polarizer 120 and a second polarizer 170 respectively arranged on the front surface and the rear surface of the LCD panel 130. A light transmission axis of the first polarizer 120 and a light transmission axis of the second polarizer 170 are perpendicular to each other (i.e., at an angle of 90°). As exemplified in FIG. 1, the first polarizer 120 at the front side of the LCD panel 130 maybe configured to transmit a linearly polarized light in the Y-axis direction and the second polarizer 170 at the rear side of the LCD panel 130 is configured to transmit a linearly polarized light in the X-axis direction.

Additionally, the dual display LCD device according to the present invention includes a selective reflection/transmission part 180 that reflects or transmits the incident light according to the polarization of the light so as to realize a dual display function using a single LCD panel 130. The selective reflection/transmission part 180 determines a propagation direction (the front or the rear) for the light, so that the image display direction is determined. The selective reflection/transmission part 180, as shown in FIG. 1, includes a first phase compensation film 140 that phase shifts the incident light by $\lambda/4$, a cholesteric liquid crystal (CLC) film 150, and a second phase compensation film 160 that phase shifts the incident light by $\lambda/4$. For example, the phase compensation films 140 and 160 may be comprised of a quarter wave plate (QWP).

In addition, the phase compensation films 140 and 160 convert the linearly polarized incident light into circularly polarized light, and convert the circularly polarized incident light into the linearly polarized light. The CLC film 150 may selectively reflect or transmit a right handed circular polarization (RHC) light or a left handed circular polarization (LHC) light.

Figure 2:
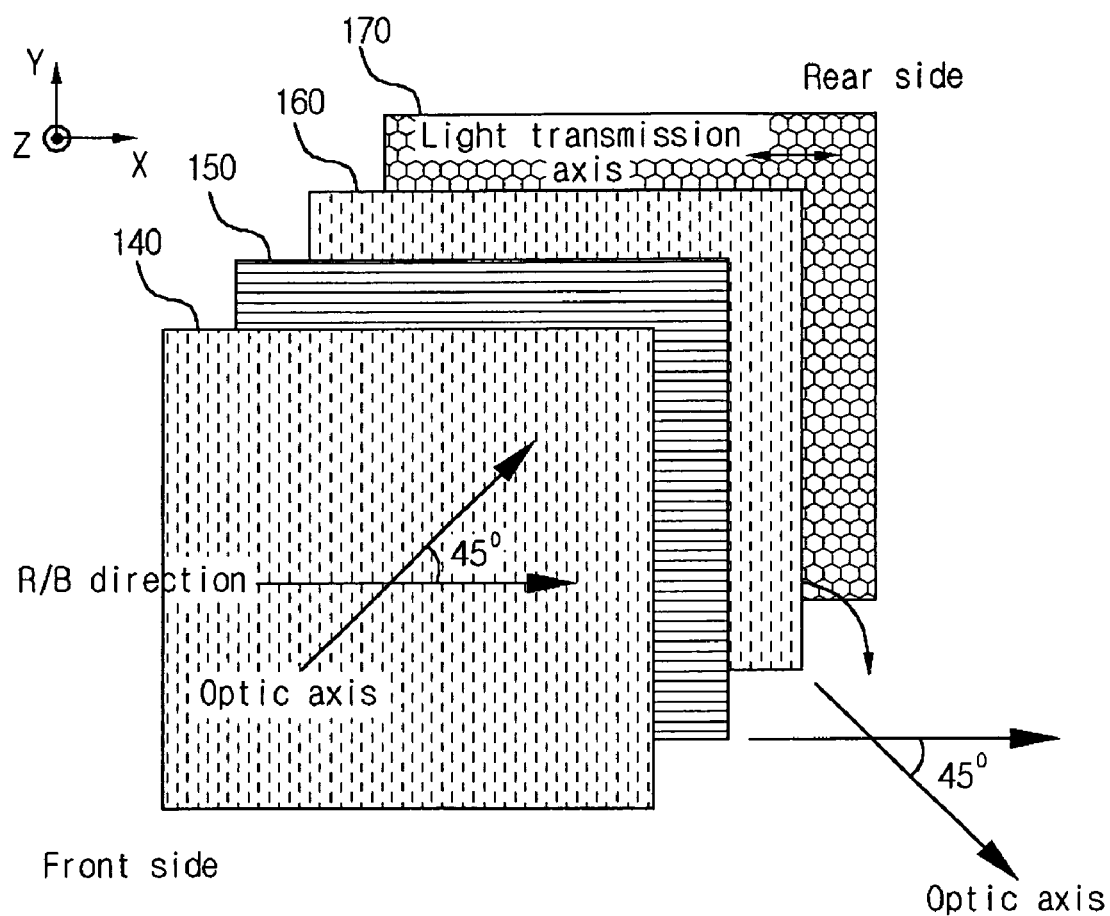
FIG. 2 illustrates an optic axis arrangement of an optical device employed in a dual display LCD device according to the present invention.

The selective reflection/transmission part 180 reflects or transmits light based upon it circular polarization and its directional inclination. The elements of the selective reflection/transmission part 180 are arranged as shown in FIG. 2. FIG. 2 is a view illustrating an optical axis arrangement of the selective reflection/transmission part 180 in the dual display LCD device according to the present invention. The selective reflection/transmission part 180 includes the first phase compensation film 140, the CLC film 150, and the second phase compensation film 160. The second polarizer 170 is behind the second phase compensation film 160.

The optical axis of the first phase compensation film 140 is at an angle of +45° with respect to the rubbing (RIB) alignment direction (X-axis) of the liquid crystal within the LCD panel 130, and the optical axis of the second phase compensation film 160 is at an angle of −45 with respect to the X-axis. Additionally, the transmission axis of the second polarizer 170 is aligned with the X-axis.

Accordingly, the selective reflection/transmission part 180 functions as follows. In the case when the linearly polarized light having a polarization in the first direction is incident on the first phase compensation film 140, the selective reflection/transmission part 180 transmits all the linearly polarized light having the first direction through the first phase compensation film 140. Further, in the case when the linearly polarized light having a polarization at an angle of 90° with respect to the first direction is incident on the first phase compensation film 140, the selective reflection/transmission part 180 reflects this linearly polarized light from the first phase compensation film 140.

When the linearly polarized light having the first direction is incident on the first phase compensation film 140, the linearly polarized light having the first direction passes through the CLC film 150 and the second phase compensation film 160. At this time, the transmitted light is linearly polarized light having the first direction.

When the linearly polarized light having a polarization at an angle of 90° with respect to the first direction is incident on the first phase compensation film 140, the linearly polarized light polarized at an angle of 90° to the first direction is all transmitted through the first phase compensation film 140 and reflected from the CLC film 150, to thereby be again transmitted back through the first phase compensation film 140. At this time, the reflected light is the linearly polarized light having a polarization at an angle of 90° with respect to the first direction.

A description of how incident light reflects or transmits principle through the dual display LCD device depending upon the linear polarization state will be described in greater detail below.

First, the description of operation of the dual display LCD device when a voltage is not applied to the LCD panel 130 will be presented, followed second by the case when a voltage is applied to the dual LCD device.

Figure 3:
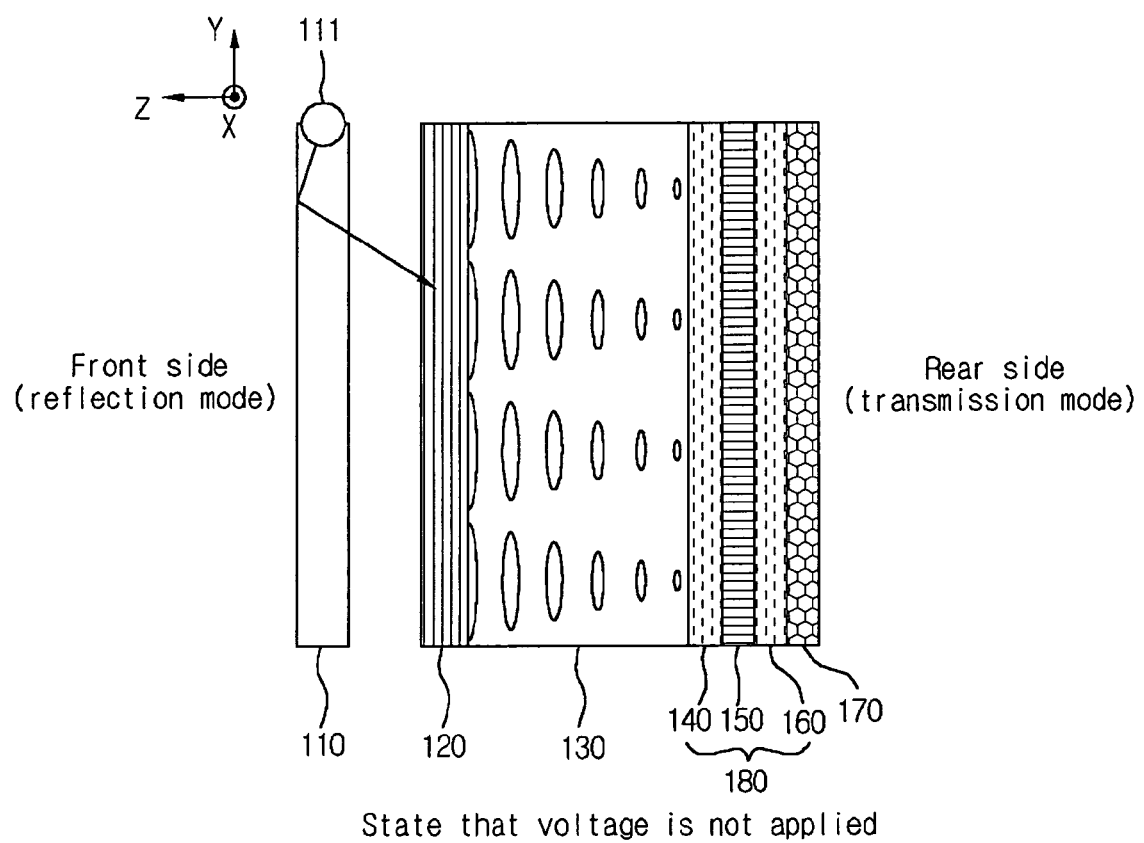
FIG. 3 is a view illustrating an operation of a dual display LCD device in case a voltage is not applied to an LCD panel according to the present invention.
Figure 4:
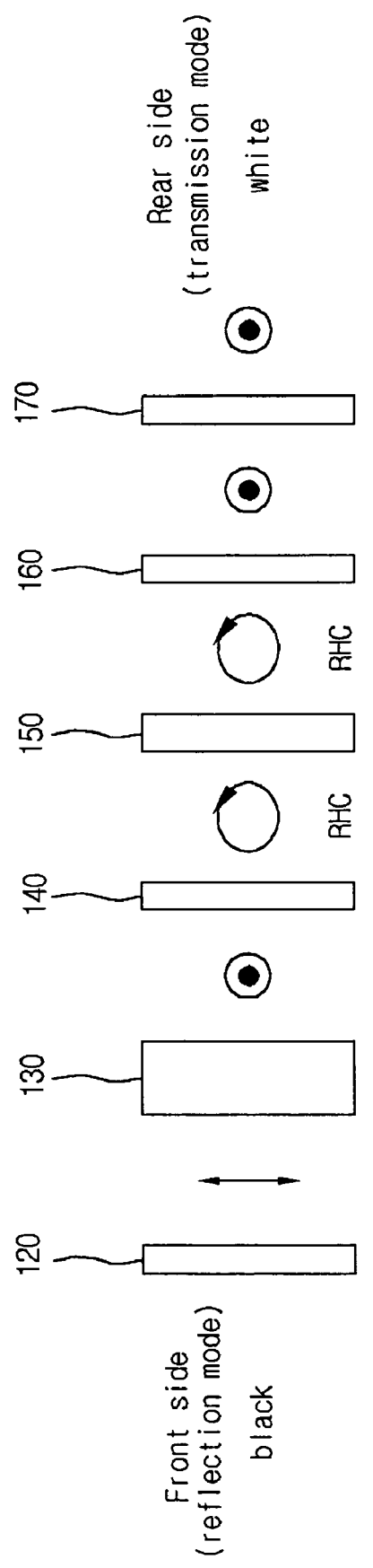
FIG. 4 is a view illustrating a polarization state of a light propagated from each structural element of a dual display LCD device in case a voltage is not applied to an LCD panel according to the present invention.

FIG. 3 is a view illustrating the operation of the dual display LCD device when no voltage is applied to the LCD panel 130 according to the present invention, and FIG. 4 is a view illustrating the polarization state of the light propagated from each structural element of the dual display LCD device in accordance with FIG. 3 according to the present invention.

Referring to FIGS. 3 and 4, when a voltage is not applied to the LCD panel 130, the incident light is linearly polarized in the direction of Y-axis while passing through the first polarizer 120 thereby being converted into light linearly polarized along the Y-axis ($\updownarrow$). And, as this linearly polarized light ($\updownarrow$) propagates through the LCD panel 130, the polarization is rotated 90° to be polarized along the X-axis ($\odot$).

Thus, as the light linearly polarized along the X-axis ($\odot$) travels through the first phase compensation film 140, the light is converted into right handed circularly polarized (RHC) light. The RHC light passes through the CLC film 150. This can be achieved through a CLC film 150 that reflects LHC light and transmits RHC light.

Accordingly, the RHC light passes through the second phase compensation film 160 thereby being converted into light linearly polarized along the X-axis ($\odot$). Thus, this light ($\odot$) passes through the second polarizer 170 with a polarization axis along the X-axis. Therefore when a voltage is not applied to the LCD panel 130, the incident light all passes through the rear of the dual display LCD device, and the dual display LCD device operates in a transmission mode thereby allowing the rear of the dual display LCD device to be in a 'white' state. Additionally, the incident light is not reflected at the front surface of the dual display LCD device thereby allowing the front of the dual display LCD device to be in a 'black' state. As such, the dual display LCD device using a single LCD panel may be embodied.

Figure 5:
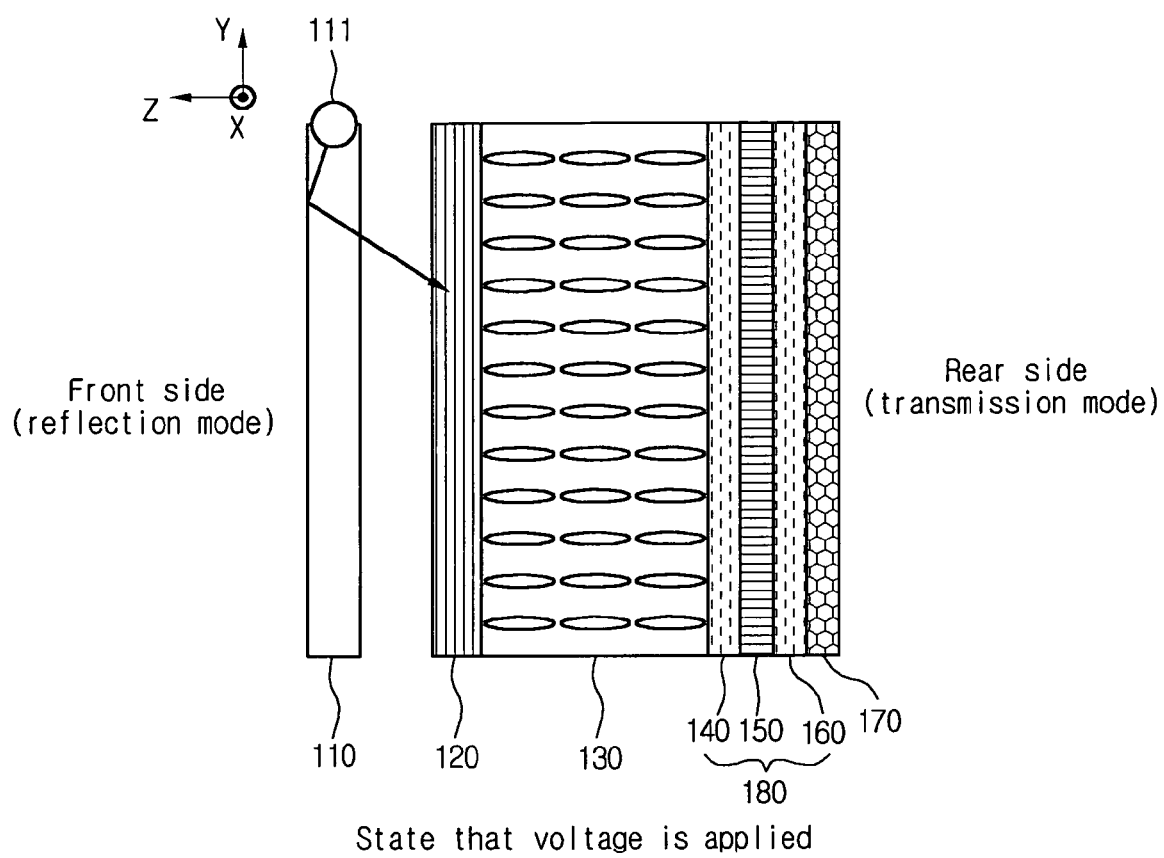
FIG. 5 is a view illustrating an operation of a dual display LCD device in case a voltage is applied to an LCD panel according to the present invention.

FIG. 5 is a view illustrating the operation of the dual display LCD device when a voltage is applied to the LCD panel 130 according to the present invention, and FIG. 6 is a view illustrating the polarization state of the light propagated from each structural element of the dual display LCD device in accordance with FIG. 5 according to the present invention.

Referring to FIGS. 5 and 6, when a voltage is applied to the LCD panel 130, the incident light is linearly polarized in the direction of Y-axis while passing through the first polarizer 120 thereby being converted into the light linearly polarized along the Y-axis ($\updownarrow$), and the polarization of the linearly polarized light ($\updownarrow$) does not change as it passes through the LCD panel 130. As this light linearly polarized along the ($\updownarrow$) the Y-axis passes through the first phase compensation film 140, the light is converted into LHC light. Next, the LHC light is reflected from the CLC film 150. This can be achieved through a CLC film 150 that reflects LHC light and transmits RHC light. The incident LHC light is reflected from the CLC film 150 toward the front of the dual display LCD device.

The LHC light reflected from the CLC film 150 passes back through the first phase compensation film 140. The LHC light passing through the first phase compensation film 140 has a polarization axis at an angle of 135° with respect to the X-axis. Accordingly, the reflected light is converted into light linearly polarized along the Y-axis ($\updownarrow$) so that is passes through the first phase compensation film 140.

The propagation characteristic of the light may be analyzed using the Jones' matrix as follows. When light linearly polarized along the Y-axis ($\updownarrow$) passes through the first phase compensation film 140 thereby being converted into the LHC light, and then the converted LHC light is reflected from the CLC film 150 back through the first phase compensation film 140 thereby being converted back into the light linearly polarized along the Y-axis ($\updownarrow$). The propagation characteristic of the linearly polarized light ($\updownarrow$) can be expressed as describe below. The light linearly polarized along the Y-axis ($\updownarrow$) may be obtained from the light passing through the first phase compensation film 140 and being incident on the LCD panel 130, by calculating the following expressions:

$$\begin{pmatrix} \cos 3\pi/4 & -\sin 3\pi/4 \\ \sin 3\pi/4 & \cos 3\pi/4 \end{pmatrix}$$

$$\begin{pmatrix} e^{-i\pi/2} & 0 \\ 0 & e^{i\pi/2} \end{pmatrix}$$

$$\begin{pmatrix} \cos 3\pi/4 & \sin 3\pi/4 \\ -\sin 3\pi/4 & \cos 3\pi/4 \end{pmatrix}$$

$$\begin{pmatrix} \cos \pi/4 & -\sin \pi/4 \\ \sin \pi/4 & \cos \pi/4 \end{pmatrix} \begin{pmatrix} e^{-i\pi/2} & 0 \\ 0 & e^{i\pi/2} \end{pmatrix} \begin{pmatrix} \cos \pi/4 & \sin \pi/4 \\ -\sin \pi/4 & \cos \pi/4 \end{pmatrix} = \begin{pmatrix} 0 \\ 1 \end{pmatrix}$$

Thus, the light linearly polarized along the Y-axis ($\updownarrow$) does not change its polarization state while passing through the LCD panel 130 which is in an optically inactive state, and passes through the first polarizer 120 with the Y-axis functioning as the polarization transmission axis thereof.

As a result, when a voltage is applied to the LCD panel 130, the incident light is all reflected at the front surface of the dual display LCD device operated in a reflection mode thereby allowing the front of the dual display LCD device to be in a 'white' state. Also, the incident light is not transmitted through the rear of the dual display LCD device operated in a transmission mode thereby allowing the rear of the dual display LCD device to be in a 'black' state. As such, the dual display LCD device using a single LCD panel may be embodied.

A first substrate with a color filter, a liquid crystal and a second substrate with a TFT array for the LCD panel 130 according to the present invention may be sequentially arranged starting from the front light unit 110. Also, the first substrate with the TFT array, the liquid crystal and the second substrate with the color filter for the LCD panel 130 may be sequentially arranged starting from the front light unit 110.

At this time, the first substrate and the second substrate may be also replaced with a plastic substrate or a glass substrate having a low reflection rate. Also, a black matrix provided on the LCD panel 130 uses a material having a low reflection rate for the light propagated from the front light unit 110. Additionally, the optical elements of each polarizing portion have a low reflection rate.

Meanwhile, because the dual display LCD device configured as described above may be used as a dual display element, if the dual display LCD device is adapted to a mobile communication terminal (mobile portable communication, PDA, etc.), an image may be displayed in both directions, i.e. on the front side and rear side, so that more image display functions may be realized in the mobile communication terminal. For example, a mobile communication terminal may include communication means for communicating with an external side and a controller for controlling the communication means and the dual display LCD device and for controlling the direction in which an image is displayed on the dual display LCD device.

For example, a folding-type mobile communication device can select a display direction for the image depending upon the device being in a closed state or an open state. Further, a sliding-type mobile communication device may set the display direction for the image display portion.

As described above, the dual display LCD device with a single LCD panel has the advantages of displaying the image on both the front and the rear of the LCD panel, and thereby resulting in a thinner dual display element and reduced manufacturing cost.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for operating a dual display liquid crystal display (LCD) device, the method comprising the steps of:
   converting light from a front light unit, into a linearly polarized light;
   passing the linearly polarized light through an LCD panel, and controlling a linear polarization state of the light passing through the LCD panel depending on whether a voltage is applied to the LCD panel; and
   selectively reflecting/transmitting the light with a selective reflection/transmission part depending on the circular polarization state of the light that has passed through the LCD panel;
   wherein the selective reflection/transmission part selectively reflects the light in a reflection mode to display an image on a front side thereof in a first display mode; and
   wherein the selective reflection/transmission part passes the light in a transmission mode to display an image on a rear side thereof in a second display mode.

2. The operating method of claim 1, wherein the selective reflection/transmission part comprises:
   a cholesteric liquid crystal (CLC) film that selectively transmits light having a first circular polarization and reflects light having a second circular polarization, wherein the first and second circular polarizations have opposite directions;
   a first phase compensation film at the front of the CLC film that generates a phase difference of about $\lambda/4$ with respect to the light; and
   a second phase compensation film at the rear of the CLC film, for generating a phase difference of about $\lambda/4$ with respect to the light.

3. The operating method of claim 1, wherein the first phase compensation film and the second phase compensation film are composed of a quarter wave plate (QWP).

4. The operating method of claim 1, wherein an angle between the optical axes of the first phase compensation film and the second phase compensation film is about 90°.

* * * * *